United States Patent Office 2,970,495
Patented Feb. 7, 1961

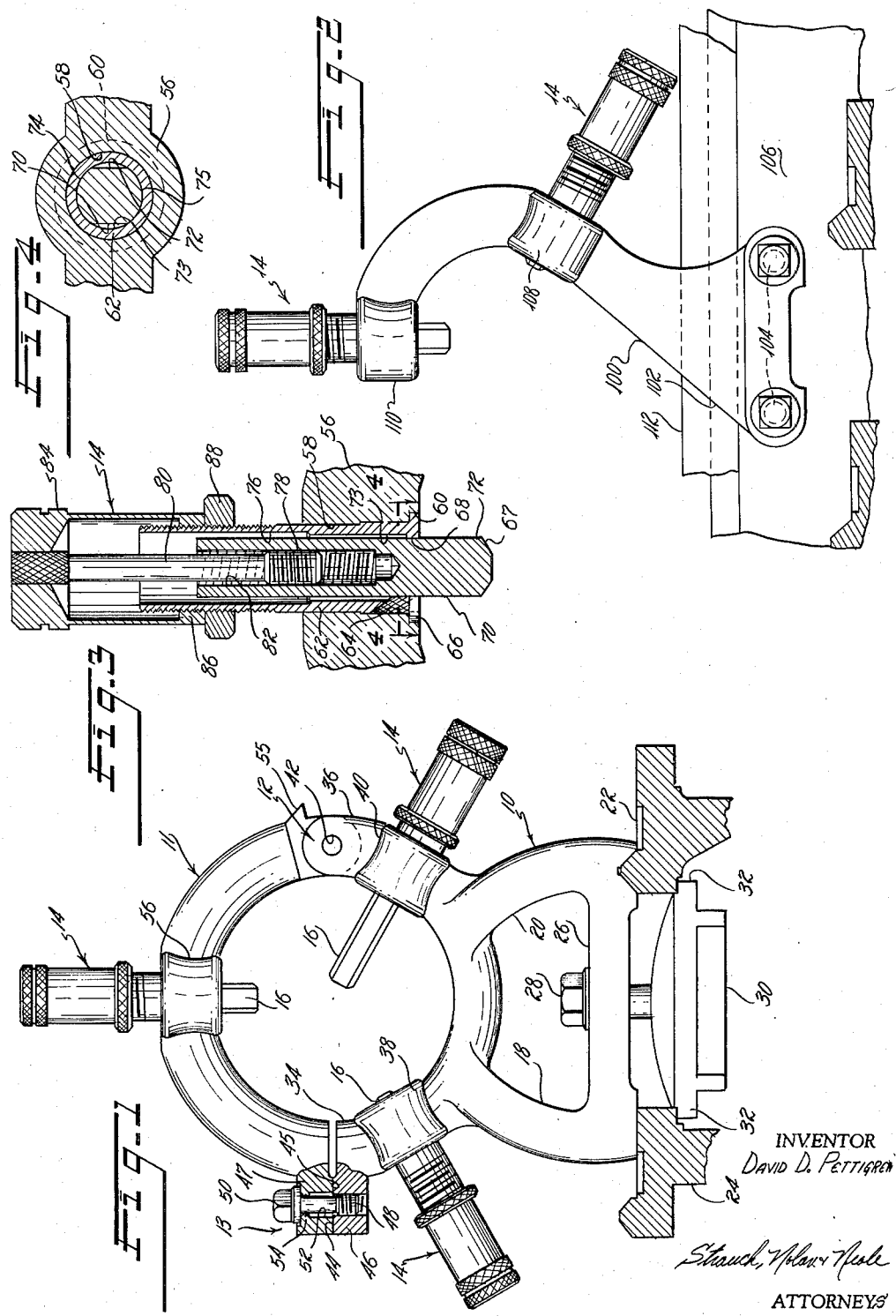

2,970,495

WORK RESTS FOR LATHES AND THE LIKE

David D. Pettigrew, Pittsburgh, Pa., assignor to Rockwell Manufacturing Company, Pittsburgh, Pa., a corporation of Pennsylvania Filed Dec. 12, 1955, Ser. No. 552,455

2 Claims. (Cl. 74—424.8)

This invention relates to work rests and more particularly to rests for supporting work pieces in lathes and the like.

Certain important aspects of the invention are applicable to the two principal types of work rests used on lathes and generally known as center rests and follower rests. The former is used primarily to provide support for the end of a work piece remote from the chuck when operations such as boring, drilling and reaming are performed on the end of the work piece and the usual tail stock cannot be used or as a stationary midpoint work support when long, slender work pieces are supported for machining. The center rest provides a true center for the work piece and is firmly supported on the lathe bed in fixed position. Since center rests generally encircle the work piece they are of two-part construction and the top of the rest is hinged to the lower section to facilitate insertion and removal of the work piece or tool.

Follower rests are fixed to the carriage and provide two point support for the work piece opposite the point of tool engagement to back up the work piece in the region of the tool and prevent bending or whipping of the work piece. In operation the follower rest moves with the tool in its axial movement along the work piece. In either case the work rest must be ruggedly constructed to precision standards. The center rests and follower rests must provide accurate three and two point support respectively for work pieces and shafts of a variety of sizes and accordingly must be easily adjustable and capable of being positively locked in adjusted position.

It is the primary purpose and object of the present invention to provide novel center and follower rests which satisfy these requirements in a unique manner.

It is a more specific object of the invention to provide improved mechanism for adjusting the position of the jaws of center and follower rests which increase the speed and ease of adjustment and render the use of wrenches and other tools unnecessary either to adjust or lock the elements.

It is a further object to provide improved apparatus for adjusting the position of the jaws which includes a compound thread construction which renders the assembly compact and increases the range of sizes of work pieces which the rests may accommodate.

It is also an object of the invention to provide improved center rests including novel means for hinging and locking the upper movable portion to the lower portion which is fixed to the lathe bed.

It is an additional object of the invention to provide novel center and follower rests which offer improved accuracy and dependability and which may be manufactured and sold at prices below the prices of prior units of comparable accuracy.

Additional objects and advantages will become apparent as the description proceeds in connection with the accompanying drawings in which:

Figure 1 is an elevation of a center rest embodying the features of the present invention, the rest being shown attached to the ways of a lathe bed;

Figure 2 is an elevation of a follower rest constructed in accordance with the invention shown attached to a lathe carriage;

Figure 3 is an enlarged central section of the mechanism for positioning the work supporting elements or jaws and illustrates a construction used in the rests of both Figures 1 and 2; and Figure 4 is a section taken along lines 4—4 of Figure 3 showing details of construction.

Referring now more particularly to the drawings and specifically to Figure 1, the principal components of the center rest shown in Figure 1 are the lower body portion 10, the upper body portion 11, the hinge and clamp assemblies 12 and 13, respectively and the support assemblies indicated generally at 14 which carry and position the work supporting elements or jaws 16.

The lower body section 10 is provided with downwardly extending legs 18 and 20, the lower end of the leg 20 being machined to fit over the front prismatic way 22 of the lathe bed and the leg 18 being machined to rest on the rear way 24 of the lathe bed to dispose the rest in arcuate predetermined position with respect to the lathe ways. The legs 18 and 20 are preferably joined by a bridge 26 through which a bolt 28 extends into threaded engagement with a clamp plate 30 which is provided with flange portions 32 which project under the adjacent surfaces of the ways 22 and 24. In a typical case, the lower ends of the legs 18 and 20 are one and three-quarters inches wide. Accordingly, when the bolt 28 is tightened the assembly is rigidly locked to the lathe ways and positively fixed against tilting or twisting movements. The lower body assembly 10 is also provided with two arcuate upwardly projecting arms 34 and 36 respectively formed with bosses 38 and 40 spaced 120° apart in which two of the jaw support assemblies 14 are mounted. The upper end of the arm 36 is preferably bifurcated to receive one end of the generally arcuate upper body assembly 11. An expandable pin 42 extends through machine bores in the adjacent ends of the arm 36 and the upper body 11 to pivotally connect the two body sections. The pin 42 is of the type sold under the trade name Rollpin and eliminates both looseness and binding at the pivotal connection. Mating machined finished planar surfaces 44 and 45 are provided on the adjacent surfaces of bosses 46 and 47 formed on the upper end of the arm 34 and the adjacent end of the upper body half 11 respectively. The lower boss 46 is tapped to receive the enlarged threaded section 48 of a clamp bolt 50. The upper boss is counterbored as at 52 to a diameter larger than the diameter of the threaded section 48 of the bolt 50 and is provided with a short tapped section 54 through which the section 48 of the bolt may be threaded. Thus while the bolt may be removed from the assembly it is normally captive. Accordingly when it is desired to swing the top rest portion away from the position shown to permit the insertion or removal of a work piece or tool, the bolt 50 is backed off a few turns out of the lower boss 46 freeing the upper body assembly to be then swung back without guarding against dislodgement or loss of the bolt 50 from the upper boss. A stop 55 is formed on the body portion 11 to limit its swinging movement.

It will also be noted that the planar surfaces 44 and 45 together with the construction of the hinge at 42 assures the rigid connection of the upper and lower rest portions 10 and 11 to maintain the jaws 16 in predetermined relative position at all times.

The upper rest assembly 11 is provided with a central boss 56 the axis of which is spaced 120° from the axes of the respective bosses 39 and 40 formed in the lower assembly 10, the boss 56 mounting the upper jaw support assembly 14. The bosses 38, 40 and 56 and the associated jaw support assemblies 14 are of identical construction, the details of which are best shown in Figure 3 which for present purposes may be assumed to illustrate the upper assembly 14 positioned in the boss 56. This boss is provided with a smooth through bore 58 terminating at its inner end in a shallow counterbore 60. A hollow cylindrical sleeve 62 is positioned in the bore 58 and is provided with a relatively enlarged knurled section 64 press fitted into the lower end of bore 58. A flange 66 formed on the lower or inner end of the sleeve 62 at the outer end of knurled section 64 is received in the counterbore 60 to limit the inward driving fit of the sleeve.

The bronze jaw 16 which has a frustro-conical work-engaging end 67 is mounted for bodily sliding movement in the sleeve 62. To assure accurate and free sliding of jaw 16 in sleeve 62, the opposed parallel sides of a slot 68 milled across the inner end of the sleeve 62 are provided to cooperate with the opposed machined flats 70 and 72 formed on the jaw to prevent relative rotation of the jaw with respect to the sleeve. Upwardly of the slot 68 the sleeve is provided with a bore 73 which is drilled to receive the opposed arcuate faces 74 and 75 of the jaw 16 with a close sliding fit. At its upper end bore 73 terminates in a slightly enlarged bore 76 to establish a clearance between the upper portion of the sleeve and the jaw 16 to minimize frictional sliding forces and to avoid the necessity for close tolerances throughout the length of the sleeve. The bore 73 is of sufficient length to prevent tilting of the jaw regardless of its axial position.

The lower portion 78 of a jaw adjustment screw 80 is provided with left hand threads and is threadedly received in the mating threads of a blind tapped bore formed 82 in the jaw 16 from the end opposite the work engaging end 67. The screw 80 extends outwardly well beyond the end of sleeve 62 and is enlarged and knurled at its upper end to be press fitted into a hollow cylindrical adjustment knob 84. The knob 84 is of substantial axial length and provided with a short internally threaded section 86 adjacent its lower end having interior right hand threads engaging the external mating threads formed on the outer surface of the portion of the sleeve 62 extending away from the boss 56. A lock nut 88 threaded onto the sleeve 62 between the boss 56 and the lower end of the sleeve 84 serves, when tightened against the lower end of the knob 84, to lock all of the components of the assembly 14 against relative axial movement with respect to the boss 56.

The jaw 16 may be moved axially of sleeve 62 to radially position its end 67 with respect to the work piece by loosening the lock nut 88 and rotating the adjustment knob 84 in the desired direction. The external annular surfaces of the adjustment knob and the lock nut are preferably knurled to facilitate their adjustment without the need for adjustment tools. Since the jaw 16 is held against relative rotation with respect to the sleeve 62, rotation of the adjustment knob 84 will not only move the knob inwardly and outwardly along sleeve 62 but will also thread the screw inwardly or outwardly of the jaw 16. Since the threads on the adjustment knob 84 and the screw 80 are of opposite hands the action of the threads is additive. Thus adjustment of the positions of the several jaws may be made rapidly and is easily effected by a minimum rotational movement of the knob 84. Further since the axial travel of the adjustment knob 84 is substantially half the axial travel of the jaw 16, the dual or compound thread construction substantially decreases the overall length of assemblies 14 and thus the radial dimensions of the unit outwardly of the body sections 10 and 11. Further a work rest of a given overall dimension incorporating the dual thread arrangement may accommodate work pieces having a much greater range of sizes.

Figure 2 discloses a follower rest incorporating the adjustment assemblies 14 described above. The body 100 of the follower rest is of one piece cast iron construction and includes a lower mounting section 102 through which bolts 104 extend to securely mount the rest on a side face of the lathe carriage 106. The upper portion of the body 100 is offset to one side of mounting section 102 to provided bosses 108 and 110 positioning the jaw assemblies 14 at or closely adjacent the center of the carriage where the cutting tool is normally positioned. The bosses 108 and 110 are so positioned angularly of the axis of the work piece that the axes of the two assemblies 14 are spaced 120° apart and the axis of the upper assembly is substantially vertical. It will be understood that the tool approaches from the right as viewed in Figure 2. The upper portion of the rest body 100 being off-set from the mounting portion 102, the assemblies 14 overlie the carriage 106 in substantial alignment with the tool slide 112 which carries the cutting tool. The jaws 16, therefore, are located to back up the work piece in the region where the cutting takes place with the result that the cutting stresses will not be effective to bend the work piece laterally causing inaccurate machining and possible dislocation of the work piece from the opposed lathe support centers.

From the foregoing it will be apparent that the above stated objects of the invention have been attained by the provision of compact, accurate, rugged, and easily and rapidly operable rests for supporting work pieces in lathes or other machine tools having aligned work support centers.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An adjusting assembly comprising a mounting sleeve having one end externally threaded and its interior wall adjacent the other end reduced in diameter to provide a cylindrical support portion terminating at said other end in an open ended cross slot, a movable jaw element elongated in an axial direction and providing opposed cylindrical segments adapted to cooperate with said support portion of said sleeve and opposed flats adapted to slidingly cooperate with the walls of said slot and non-rotatably associate said jaw element and said sleeve and having a blind tapped bore extending inwardly from its outer end, a hollow adjusting knob internally threaded to cooperate with the external threads of said mounting sleeve and carrying a coaxially disposed elongated stem terminating at its free end in an enlarged threaded section of substantially lesser length than said blind tapped bore adapted to threadedly engage in said blind bore, said external sleeve threads and said blind bore threads being of opposite hand whereby upon threading of said knob along said mounting sleeve said jaw will be displaced by both of said threads, and a locking member threaded on said mounting sleeve and adapted to bear against the adjacent end of said hollow adjusting knob to frictionally lock the latter in adjusted position.

2. An adjusting assembly comprising an elongated jaw having opposed arcuate side surfaces separated by opposed flat side surfaces; a sleeve having an externally threaded portion, said sleeve having an internal cylindrical bore extending along a portion of its length for slidably supporting said arcuate side surfaces of said jaw and having a slot extending across its inner end, the side surfaces of which slidably engage the flat side surfaces of said jaw whereby said jaw may slide freely through said sleeve but is locked against rotation therein; an internally threaded adjustment member threaded onto the threaded portion of said sleeve; an adjustment screw rigid with said member and threaded into one end of said jaw, the threads on said sleeve and said screw being of opposite hand whereby upon rotation of said adjustment knob said jaw will be axially displaced by both of said threads in the same direction, and a locking member threaded on said sleeve and adapted to selectively abut the end of said adjustment member to selectively lock said adjustment member in adjusted position.

References Cited in the file of this patent

UNITED STATES PATENTS

| | | |
|---|---|---|
| 313,447 | Putnam | Mar. 3, 1885 |
| 334,615 | Rose | Jan. 19, 1886 |
| 368,749 | Bogert | Aug. 23, 1887 |
| 584,001 | LeBlond | June 8, 1897 |
| 585,184 | Clarke | June 29, 1897 |
| 944,630 | McCullough | Dec. 28, 1909 |
| 1,815,490 | Bouillon | July 21, 1931 |
| 1,927,780 | Anderson | Sept. 19, 1933 |
| 2,094,225 | Tuttle | Sept. 28, 1937 |
| 2,390,888 | Liber | Dec. 11, 1945 |
| 2,445,396 | Gursky | July 20, 1948 |
| 2,565,628 | Ravilious | Aug. 28, 1951 |
| 2,791,921 | Heppenstall | May 14, 1957 |

FOREIGN PATENTS

| | | |
|---|---|---|
| 8,798 | Great Britain | 1906 |
| 521,794 | France | Feb. 12, 1919 |
| 354,006 | Great Britain | Aug. 6, 1931 |
| 733,315 | Great Britain | July 6, 1955 |